US012206089B2

(12) United States Patent
Song et al.

(10) Patent No.: US 12,206,089 B2
(45) Date of Patent: Jan. 21, 2025

(54) NEGATIVE ELECTRODE FOR LITHIUM SECONDARY BATTERY AND LITHIUM SECONDARY BATTERY COMPRISING THE SAME

(71) Applicant: LG Chem, Ltd., Seoul (KR)

(72) Inventors: Jun Hyuk Song, Daejeon (KR); Joo Sung Lee, Daejeon (KR); Eun Kyung Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 895 days.

(21) Appl. No.: 16/493,878

(22) PCT Filed: Sep. 14, 2018

(86) PCT No.: PCT/KR2018/010877
§ 371 (c)(1),
(2) Date: Aug. 7, 2020

(87) PCT Pub. No.: WO2019/054811
PCT Pub. Date: Mar. 21, 2019

(65) Prior Publication Data
US 2020/0381688 A1  Dec. 3, 2020

(30) Foreign Application Priority Data
Sep. 15, 2017 (KR) ........................ 10-2017-0118693

(51) Int. Cl.
*H01M 4/133* (2010.01)
*H01M 4/02* (2006.01)
(Continued)

(52) U.S. Cl.
CPC ........... *H01M 4/133* (2013.01); *H01M 4/587* (2013.01); *H01M 4/62* (2013.01);
(Continued)

(58) Field of Classification Search
CPC .................................................... H01M 4/133
See application file for complete search history.

(56) References Cited

U.S. PATENT DOCUMENTS

| 6,982,132 B1 | 1/2006 | Goldner et al. |
| 2005/0069775 A1* | 3/2005 | Hwang ................ H01M 4/587 |
| | | 429/231.95 |

(Continued)

FOREIGN PATENT DOCUMENTS

| CN | 1601798 A | 3/2005 |
| CN | 104919629 A * | 9/2015 ........ H01M 10/0525 |

(Continued)

OTHER PUBLICATIONS

Leong, K. C., Li, H. Y., Jin, L. W., and Chai, J. C. (Mar. 4, 2011). "Convective Heat Transfer in Graphite Foam Heat Sinks With Baffle and Stagger Structures." ASME. J. Heat Transfer. Jun. 2011; 133(6): 060902 (Year: 2011).*

(Continued)

*Primary Examiner* — Matthew T Martin
*Assistant Examiner* — Krishna R Hammond
(74) *Attorney, Agent, or Firm* — Lerner David LLP

(57) ABSTRACT

Provided are a negative electrode for a lithium secondary battery having reinforced insulating properties, which comprises a negative electrode active material layer; and a ceramic separating layer formed on the negative electrode active material layer, wherein the negative electrode active material layer has an arithmetic average surface roughness (Ra) of 0.01 μm to 0.3 μm, and the ceramic separating layer has a thickness of 1 μm to 30 μm, and a lithium secondary battery comprising the same.

15 Claims, 2 Drawing Sheets

(51) Int. Cl.
   *H01M 4/587*    (2010.01)
   *H01M 4/62*     (2006.01)
   *H01M 10/0525*  (2010.01)
   *H01M 50/434*   (2021.01)
   *H01M 50/46*    (2021.01)
   *H01M 50/489*   (2021.01)
   *H01M 50/491*   (2021.01)

(52) U.S. Cl.
   CPC ..... *H01M 10/0525* (2013.01); *H01M 50/434* (2021.01); *H01M 50/46* (2021.01); *H01M 50/489* (2021.01); *H01M 50/491* (2021.01); *H01M 2004/021* (2013.01); *H01M 2004/027* (2013.01)

(56) References Cited

U.S. PATENT DOCUMENTS

| | | |
|---|---|---|
| 2006/0188785 A1 | 8/2006 | Inoue et al. |
| 2009/0280413 A1 | 11/2009 | Ohta et al. |
| 2014/0287316 A1 | 9/2014 | Ahn et al. |
| 2014/0356707 A1* | 12/2014 | Kwon .................. H01M 4/587 427/113 |
| 2015/0194668 A1* | 7/2015 | Ueda .................... H01M 4/625 252/182.1 |
| 2016/0028061 A1 | 1/2016 | Tanaka et al. |
| 2016/0211521 A1* | 7/2016 | Iwayasu ............ H01M 10/4235 |
| 2017/0005308 A1* | 1/2017 | Fujii ................. H01M 10/0567 |
| 2017/0133671 A1* | 5/2017 | Choi .................. H01M 4/587 |
| 2017/0170441 A1* | 6/2017 | Arnold .................. H01M 50/46 |
| 2017/0187063 A1* | 6/2017 | Pistorino ............ H01M 10/056 |
| 2017/0244099 A1* | 8/2017 | Park ..................... H01M 4/625 |

FOREIGN PATENT DOCUMENTS

| | | | | |
|---|---|---|---|---|
| CN | 106104871 A | * | 11/2016 | ............. C01B 32/20 |
| CN | 106688123 A | * | 5/2017 | ........ H01M 10/0525 |
| CN | 107819110 A | * | 3/2018 | ........ H01M 10/0525 |
| EP | 1659650 A1 | | 5/2006 | |
| JP | 3367342 B2 | | 1/2003 | |
| JP | 2008-059903 A | | 3/2008 | |
| JP | 2011146365 A | | 7/2011 | |
| JP | 2014127275 A | | 7/2014 | |
| JP | 5576740 B2 | | 8/2014 | |
| KR | 100570677 B1 | | 4/2006 | |
| KR | 20060033029 A | | 4/2006 | |
| KR | 20090108317 A | | 10/2009 | |
| KR | 101351733 B1 | | 1/2014 | |
| KR | 20140095980 A | | 8/2014 | |
| KR | 2014-0140323 A | | 12/2014 | |
| KR | 20170007140 A | | 1/2017 | |
| TW | I447992 B | * | 8/2014 | |
| WO | 2005098997 A1 | | 10/2005 | |
| WO | 2014168019 A1 | | 10/2014 | |
| WO | WO-2015037451 A1 | * | 3/2015 | ........ H01M 10/0525 |

OTHER PUBLICATIONS

Search Report dated Jan. 11, 2022 from the Office Action for Chinese Application No. 201880017060 issued Jan. 20, 2022, 2 pgs.
International Search Report for PCT/KR2018/010877 mailed Dec. 17, 2018.
Extended European Search Report with Written Opinion for Application No. 18855269.9 dated Apr. 3, 2020, 8 pages.

* cited by examiner

NEGATIVE ELECTRODE FOR LITHIUM SECONDARY BATTERY AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2018/010877, filed on Sep. 14, 2018, which claims priority from Korean Patent Application No. 10-2017-0118693, filed on Sep. 15, 2017, the disclosures of which are incorporated herein by reference.

TECHNICAL FIELD

The present invention relates to a negative electrode for a lithium secondary battery and a lithium secondary battery comprising the same, and more particularly, to a negative electrode for a unified stack cell lithium secondary battery which has reinforced insulation properties and a lithium secondary battery comprising the same.

BACKGROUND ART

Demand for secondary batteries as an energy source has been significantly increased as technology development and demand with respect to mobile devices have increased, and among these secondary batteries, lithium secondary batteries having high energy density, high operating potential, long cycle life, and low self-discharging rate have been commercialized and widely used.

A lithium secondary battery is a secondary battery which is generally composed of a positive electrode comprising a positive electrode active material, a negative electrode comprising a negative electrode active material, a separator, and an electrolyte, and is charged and discharged by intercalation-deintercalation of lithium ions. Since the lithium secondary battery is advantageous in that it has high energy density and large electromotive force, and may exhibit high capacity, the lithium secondary battery has been applied to various fields.

In general, a lithium secondary battery is manufactured by alternately overlapping a positive electrode, a negative electrode, and a separator, inserting the resultant product into a battery case formed as a can or pouch having a predetermined size and shape, and finally injecting an electrolyte.

When such a secondary battery is over-charged than common charge conditions, or a negative electrode plate and a positive electrode plate of an electrode assembly are short, a mixture electrolyte of a lithium salt and an organic solvent may be decomposed at the positive electrode plate, and a lithium metal may be precipitated at the negative electrode plate to deteriorate battery properties and induce internal short. The defects accompanied with the short of the secondary battery in a common lithium secondary battery are going to be solved using the characteristics of a separator. The separator is a polymer film disposed between a positive electrode and a negative electrode and having a porous structure, and plays the role of preventing the contact between the positive electrode and the negative electrode as well as being provided as a passage for moving lithium ions actively.

Recently, attempts for introducing a thin-film type separator are made to manufacture a lithium secondary battery having high energy density. Since the ionic conductivity of a non-aqueous electrolyte is very low when compared with that of an aqueous electrolyte, the reaction area of the electrode is required to increase while decreasing the distance between electrode plates to accomplish high power and high energy density in a battery. Accordingly, attempts for increasing electrolyte concentration around a separator to promote the movement of materials by decreasing the thickness of the separator have been conducted. However, with the decrease of the thickness of the separator, pinholes may be formed during manufacturing, or a separator may be broken to increase the possibility of inducing short, thereby generating limitations of safety deterioration. As a method for solving such limitations, a unified stack cell in which a ceramic layer is interposed between a positive electrode and a negative electrode instead of a conventional polyolefin separator has been received attention.

However, if a ceramic layer is used instead of the conventional polyolefin separator, defects relating to the generation of pinholes as in the conventional polyolefin separator may not arise, but the ceramic layer is required to have a thickness of a certain degree or greater, because if the thickness is decreased to improve energy density, insulating properties and safety might be deteriorated.

Accordingly, in order to decrease the thickness of a ceramic layer which is used as a separator, there is a need to develop a novel method for solving the limitations relating to insulating properties and safety deterioration, which might be generated if the ceramic layer has a thickness of a certain degree or less.

DISCLOSURE OF THE INVENTION

Technical Problem

An aspect of the present invention provides a negative electrode for a unified stack cell lithium secondary battery which has reinforced insulating properties.

Another aspect of the present invention provides a unified stack cell lithium secondary battery which comprises the negative electrode for a lithium secondary battery and has reinforced insulating properties.

Technical Solution

According to an aspect of the present invention, there is provided a negative electrode for a lithium secondary battery, which comprises a negative electrode active material layer; and a ceramic separating layer formed on the negative electrode active material layer, wherein the negative electrode active material layer has an arithmetic average surface roughness (Ra) of 0.01 µm to 0.3 µm, and the ceramic separating layer has a thickness of 1 µm to 30 µm.

According to another aspect of the present invention, there is provided a lithium secondary battery comprising the negative electrode, and a positive electrode, wherein a positive electrode active material layer of the positive electrode is disposed to make contact with a ceramic separating layer of the negative electrode.

Advantageous Effects

The negative electrode for a lithium secondary battery of the present invention comprises a negative electrode active material layer of which surface roughness is controlled to a certain degree or less, and the insulating properties of a ceramic separating layer which is formed on the negative electrode active material layer are improved and improved safety may be achieved. Accordingly, a lithium secondary battery manufactured by contacting the ceramic separating layer with the positive electrode may also show excellent safety.

BEST MODE FOR CARRYING OUT THE INVENTION

Figure 1:
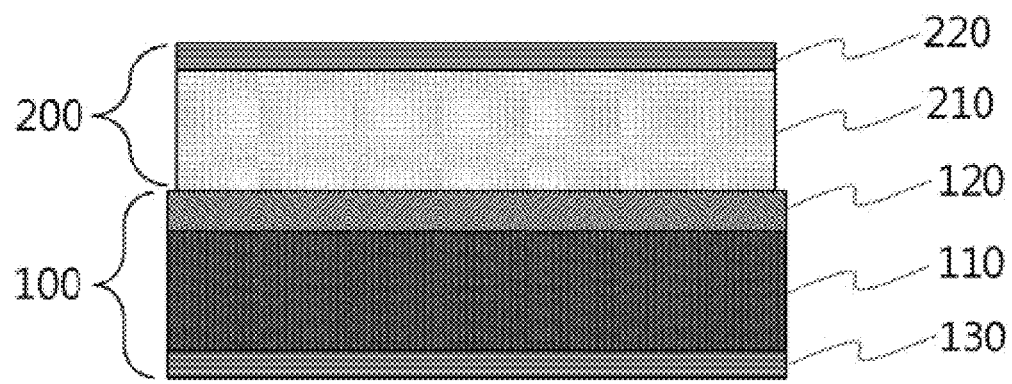
FIG. 1 is a diagram schematically showing the cross-sectional view of a lithium secondary battery comprising a negative electrode for a lithium secondary battery according to an embodiment of the present invention.

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The negative electrode for a lithium secondary battery of the present invention comprises a negative electrode active material layer; and a ceramic separating layer formed on the negative electrode active material layer, wherein the negative electrode active material layer has an arithmetic average surface roughness (Ra) of 0.01 μm to 0.3 μm, and the ceramic separating layer has a thickness of 1 μm to 30 μm.

The arithmetic average surface roughness (Ra) of the negative electrode active material layer may be 0.01 μm to 0.3 μm, particularly, 0.05 μm to 0.2 μm, more particularly, 0.1 μm to 0.2 μm. If the arithmetic average surface roughness (Ra) of the negative electrode active material layer satisfies the above range, a ceramic separating layer may be uniformly formed on the negative electrode active material layer and the ceramic separating layer may stably keep insulation properties during using a battery, and thus, a battery comprising the same may show excellent safety. In addition, if the arithmetic average surface roughness (Ra) of the negative electrode active material layer satisfies the above range, the ceramic separating layer which may play the function as a separator of a lithium secondary battery, may keep appropriate mechanical strength even though the thickness of the ceramic separating layer is small, and the function as a separator may be stably performed. Accordingly, the thickness of the ceramic separating layer may become smaller than the thickness of a separator composed of a common polyolefin-based resin, etc., which may be from 1 μm to 30 μm.

That is, since the surface roughness of the negative electrode active material layer in the negative electrode for a lithium secondary battery of the present invention is controlled to have a certain arithmetic average surface roughness (Ra), a ceramic separating layer may be uniformly formed on the negative electrode active material layer and the ceramic separating layer may stably keep insulating properties during using a battery. Accordingly, a battery comprising a negative electrode for a lithium secondary battery of the present invention may show excellent safety.

The negative electrode active material layer included in the negative electrode for a lithium secondary battery of the present invention may comprise a negative electrode active material having an average particle diameter ($D_{50}$) of 7 μm to 30 μm, particularly, 10 μm to 25 μm, more particularly, an average particle diameter ($D_{50}$) of 10 μm to 20 μm.

If the negative electrode active material layer comprises a negative electrode active material with a smaller particle diameter than the above range, the discharge capacity of the negative electrode may decrease, and initial efficiency may decrease, and if the negative electrode active material with a larger particle size than the above range is included, it may be difficult that a negative electrode slurry may be appropriated coated to a uniform thickness, and it may be difficult that the negative electrode active material layer has appropriate porosity and the surface roughness has the above range of the arithmetic average surface roughness (Ra) value.

In the negative electrode for a lithium secondary battery according to an embodiment of the present invention, the negative electrode active material may comprise a graphite-based active material.

The graphite-based active material may be one or more selected from the group consisting of natural graphite, artificial graphite, kish graphite, pyrolytic carbon, mesophase pitch-based carbon fibers, meso-carbon microbeads, mesophase pitches, petroleum-based cokes, and coal-based cokes, particularly, block graphite which has a spherical secondary particle structure obtained by aggregating or combining a plurality of initial particles composed of graphite. In this case, the secondary particle structure may be obtained by aggregating, combining or assembling the plurality of initial particles in nonparallel mode to each other.

The term "initial particles" used in the description of the present invention means original particles in case where different kind of particles are formed from a certain kind of particles, and a plurality of initial particles may be aggregated, combined or assembled to form secondary particles.

The term "secondary particles" used in the present invention means large particles which may be physically separated and formed by aggregating, combining or assembling individual initial particles.

The initial particle of the block graphite may be artificial graphite obtained by firing one or more carbon raw materials selected from the group consisting of needle cokes, mosaic cokes and coaltar pitch and crystallizing, particularly, artificial graphite having isotropic crystal structure which is synthesized by using non-needle petroleum-based pitch cokes as a raw material.

The edge part of the initial particles may have a bent layer structure into a polygonal shape. Accordingly, though solvent molecules are co-intercalated between graphite layers in a coordination state with lithium, since the graphite layer of the edge part has a bent structure into a polygonal shape, the intra-layer distance of graphite may be easily increased when compared with graphite with high crystallinity. Accordingly, effects due to steric hindrance may decrease and solvolysis may be suppressed. That is, since the graphite layer has a bent structure into a polygonal shape at the edge part, the decomposition reaction of a solvent such as an electrolyte in a non-aqueous electrolyte secondary battery may be suppressed. The structure may be confirmed by a transmission electron microscope (TEM).

If the block graphite is applied to the negative electrode active material of a lithium secondary battery, irreversible capacity during activation is small, rapid discharge characteristics are excellent, and a lithium secondary battery having excellent cycle characteristics may be manufactured. Particularly, the negative electrode active material layer may have an arithmetic average surface roughness (Ra) in the above range without a separate coating layer.

The negative electrode active material layer may have a pellet density of 1.7 g/cc or more, particularly, 1.8 g/cc to 2.2 g/cc, more particularly, 1.8 g/cc to 1.9 g/cc with the application of a pressure of 1,000 kg/m$^3$.

The pellet density represents the density of a pellet in case where a negative electrode slurry forming the negative electrode active material layer is put in a pellet zig, and a pressure of 1,000 kg/m$^3$ is applied to form a pellet shape.

If the pellet density of the negative electrode active material layer satisfies the above range, the negative electrode active material layer comprising the same may comprise a negative electrode active material with the average particle diameter ($D_{50}$) range and may satisfy the above arithmetic average surface roughness (Ra) value range.

In addition, the negative electrode active material layer may have an orientation ($I_{004}/I_{110}$) of 50 or more, particularly, 50 to 70, more particularly, 50 to 65, in case where the density of a negative electrode slurry forming the negative electrode active material layer is 1.6 g/cc and measurement was conducted by XRD.

The orientation ($I_{004}/I_{110}$) of the negative electrode active material layer is a peak intensity ratio ($I_{004}/I_{110}$) of (004) surface and (110) surface by an X-ray diffraction analysis in an electrode state. The peak intensity ratio may be obtained through X-ray diffraction analysis, and the X-ray diffraction analysis in an electrode state means that the negative electrode active material is manufactured into a negative electrode state and then, X-ray diffraction analysis is performed. The X-ray diffraction analysis may be measured using an X-ray diffraction analyzer, Bruker D4 Endeavor and using Cu-Kα-ray, and numerical values may be corrected through a Topas3 fitting program. Measurement may be performed using silicone with high purity as an internal standard specimen and computation may be performed by a method of the society for promotion of scientific research (measurement method determined by the seventeenth committee of Japan Society for promotion of scientific research).

The negative electrode for a lithium secondary battery according to an embodiment of the present invention selects and comprises a negative electrode active material which may serve a negative electrode active material layer having a certain pellet density and negative electrode orientation, as a negative electrode active material, and the negative electrode active material layer may have the arithmetic average surface roughness (Ra) value in the above range though not comprising a negative electrode active material having a specifically small average particle diameter or not forming a separate coating layer on the negative electrode active material layer to decrease surface roughness. The negative electrode active material may particularly be a graphite-based negative electrode active material.

That is, the negative electrode for a lithium secondary battery according to an embodiment of the present invention selects a specific negative electrode active material having an appropriate particle diameter range as a negative electrode active material, and the negative electrode may have certain values of pellet density and negative electrode orientation and at the same time, the arithmetic average surface roughness (Ra) value of the surface may be in an appropriate range. Through this, appropriate discharge capacity and excellent initial efficiency may be shown, and insulating properties and safety of a ceramic separating layer may be improved.

Meanwhile, in the negative electrode for a lithium secondary battery according to an embodiment of the present invention, the negative electrode active material layer may comprise a first negative electrode active material layer and a second negative electrode active material layer formed on the first negative electrode active material layer.

In this case, the first negative electrode active material layer may comprise a negative electrode active material having an average particle diameter ($D_{50}$) of 5 μm to 30 μm, particularly, 6 μm to 25 μm, more particularly, an average particle diameter ($D_{50}$) of 7 μm to 20 μm. The second negative electrode active material layer may comprise a negative electrode active material having an average particle diameter ($D_{50}$) of 0.03 μm to 7 μm, particularly, an average particle diameter ($D_{50}$) of 0.03 μm to 5 μm.

The negative electrode active material included in the first negative electrode active material layer may be a graphite-based active material as described above, and the negative electrode active material included in the second negative electrode active material layer may not be specifically limited only if a compound may perform reversible intercalation and de-intercalation of lithium. Particularly, the negative electrode active material included in the first negative electrode active material layer may be fragment graphitized graphite, and the negative electrode active material included in the second negative electrode active material layer may be block graphite.

The fragment (powder) graphitized graphite may be obtained by aggregating, combining or assembling a plurality of initial particles which are composed of graphite, and may form a lump shape. The initial particles of the fragment graphite may be artificial graphite obtained by firing and crystallizing one or more carbon materials selected from the group consisting of needle cokes, mosaic cokes and coaltar pitch, and may particularly have an isotropic crystal structure synthesized using non-needle petroleum-based pitch cokes as a raw material and high crystallinity. The average particle diameter of the initial particles of the fragment graphitized graphite may be 2 μm to 10 μm.

The ceramic separating layer formed on the negative electrode active material layer may prevent the short between a positive electrode and a negative electrode and pass an electrolyte, and further, may provide a passage for actively moving lithium ions included in a lithium secondary battery. Accordingly, the ceramic separating layer may play the role of a separator which is included in a common lithium secondary battery. Accordingly, the lithium secondary battery comprising the negative electrode for a lithium secondary battery according to an embodiment of the present invention may be a unified stack cell lithium secondary battery which does not comprise an extra separator.

The ceramic separating layer may comprise pores having an average diameter ($D_{50}$) of 1 nm to 50 μm if measured at the surface thereof, and the pores may particularly have an average diameter ($D_{50}$) of 10 nm to 10 μm, more particularly an average diameter ($D_{50}$) of 10 nm to 5 μm. If the average diameter ($D_{50}$) of the pores is 1 μm or more, an electrolyte may easily pass through the ceramic separating layer. If the average diameter ($D_{50}$) of the pores is 50 μm or less, insulating properties between a positive electrode and a negative electrode may be stably shown.

In the present invention, the average diameter ($D_{50}$) or the average particle diameter ($D_{50}$) may be defined as a particle diameter with 50% standard in particle diameter distribution. The average diameter or the average particle diameter is not specifically limited but may be measured using a laser diffraction method or a scanning electron microscope (SEM) photographic image. By the laser diffraction method, generally, the measurement of a particle diameter from a submicron region to several mm degrees may be possible, and results with high reproducibility and high resolution may be obtained.

The ceramic separating layer may have a porosity of 5% to 60%, particularly, a porosity of 30% to 50%. If the ceramic separating layer has a porosity in the range, an electrolyte may easily pass the ceramic separating layer, and the ceramic separating layer may stably show appropriate mechanical strength and insulating properties between a positive electrode and a negative electrode.

The ceramic separating layer may comprise one or more inorganic particles selected from the group consisting of $Al_2O_3$, $ZrO_2$, $SiO_2$, $TiO_2$, ZnO, $BaTiO_3$, $SrTiO_3$, $CaCO_3$, CaO, $CeO_2$, NiO, MgO, $SnO_2$, $Y_2O_3$, $Pb(Zr,Ti)O_3$ (PZT), $(Pb,La)(Zr,Ti)O_3$ (PLZT), $PB(Mg_3Nb_{2/3})O_3$—$PbTiO_3$ (PMN-PT) and hafnia ($HfO_2$), and particularly, may comprise one or more inorganic particles selected from the group consisting of $Al_2O_3$, $ZrO_2$, $SiO_2$, $TiO_2$. The inorganic particle may be included in a powder shape and may have an average particle diameter ($D_{50}$) of 10 nm to 10 μm, more particularly, an average particle diameter ($D_{50}$) of 100 nm to 1 μm.

If the average particle diameter of the inorganic particle is 10 nm or more, the inorganic particles in the ceramic separating layer show appropriate dispersibility so as not to agglomerate, thereby forming appropriate pores which may be a passage of an electrolyte. If the average particle diameter of the inorganic particles is 10 μm or less, the ceramic separating layer may be formed to have an appropriate thickness.

The ceramic separating layer may be formed by a method of spraying or applying a material included in the ceramic separating layer.

The ceramic separating layer may comprise a binder in addition to the inorganic particles, and in an embodiment of the present invention, the formation of the ceramic separating layer may be performed by a wet-type applying comprising applying an aqueous slurry or an organic slurry obtained by mixing the inorganic particles and the binder with a solvent, on the negative electrode active material layer.

The ceramic separating layer may comprise the inorganic particle and the binder in a weight ratio of 99:1 to 80:20, particularly, in a weight ratio of 95:5 to 90:10.

The binder may use any binder used in the art without specific limitation, for example, binders such as carboxymethyl cellulose (CMC), hydroxypropylene cellulose, diacetylene cellulose, polyacrylic acid, a (meth)acrylate-based binder, polyvinyl alcohol, polyvinyl chloride, polytetrafluoroethylene (PTFE), polyvinylidene fluoride (PVDF), polyvinylpyrrolidone, a conjugated diene-based binder, acrylonitrile-butadiene rubber, styrene butadiene rubber (SBR), an ethylene-propylene-diene monomer (EPDM), sulfonated EPDM and an imide-based binder, may be used.

The solvent may comprise an organic solvent such as N-methyl pyrrolidone (NMP), dimethyl formamide (DMF), acetone, and dimethyl acetamide, or an aqueous solvent such as water.

The ceramic separating layer may have a thickness of 1 μm to 30 μm, particularly, 3 μm to 20 μm, more particularly, a thickness of 5 μm to 10 μm. If the thickness of the ceramic separating layer is 1 μm or more, the ceramic separating layer may show appropriate strength, and if the thickness of the ceramic separating layer is 30 μm or less, the total thickness of a total electrode assembly comprising a negative electrode may decrease, and the thinning of a lithium secondary battery comprising the same may be achieved.

A lithium secondary battery comprising the negative electrode for a lithium secondary battery according to an embodiment of the present invention may be a unified stack cell lithium secondary battery which does not comprise an extra separator. Accordingly, there is provided in the present invention a lithium secondary battery comprising the negative electrode for a lithium secondary battery according to an embodiment of the present invention, and a positive electrode, wherein the positive electrode active material layer of the positive electrode is disposed to make contact with the ceramic separating layer of the negative electrode.

The negative electrode and the positive electrode of the lithium secondary battery are oppositely disposed across the ceramic separating layer, and the ceramic separating layer plays the role of a separator. Accordingly, the lithium secondary battery according to an embodiment of the present invention may not comprise an additional separator.

FIG. 1 shows a diagram schematically illustrating the cross-section of a lithium secondary battery comprising a negative electrode for a lithium secondary battery according to an embodiment of the present invention.

Referring to FIG. 1, in the lithium secondary battery according to an embodiment of the present invention, a ceramic separating layer (120) is disposed between a negative electrode (100) and a positive electrode (200), and in the negative electrode (100) and the positive electrode (200), a negative electrode active material layer (110) and a positive electrode active material layer (210) are oppositely disposed across the ceramic separating layer (120).

The negative electrode may be manufactured by a common method known in the art, for example, by coating a negative electrode collector (130) with a negative electrode active material slurry which is obtained by mixing the negative electrode active material, a binder, and an additive such as a conductive agent and stirring, and then drying and compressing.

The binder may be used to combine negative electrode active material particles to keep a molded body and any common binders used for preparing a slurry for a negative electrode active material may be used without specific limitation, for example, a non-aqueous binder such as polyvinyl alcohol, carboxymethyl cellulose, hydroxypropylene cellulose, diacetylene cellulose, polyvinyl chloride, polyvinyl pyrrolidone, polytetrafluoroethylene (PTFE), polyvinylidene fluoride (PVdF), polyethylene and polypropylene may be used, and any one or a mixture of two or more selected from the group consisting of acrylonitrile-butadiene rubber, styrene-butadiene rubber and acrylic rubber, which are aqueous binders may be used. The aqueous binder is economic, eco-friendly, and harmless to workers and has better combining effect when compared with a non-aqueous binder. Accordingly, the ratio of an active material per the same volume may be increased to achieve high capacity. As the aqueous binder, preferably, styrene-butadiene rubber may be used.

The binder may be included in an amount of 10 wt % or less, particularly, 0.1 wt % to 10 wt % in the total weight of the slurry for a negative electrode active material. If the amount of the binder is less than 0.1 wt %, effects according to the use of the binder may be insignificant and unpreferable, and if the amount is greater than 10 wt %, the capacity per volume may be degraded undesirably due to the decrease of the relative amount of the active material according to the increase of the amount of the binder.

The conductive agent is not particularly limited as long as it has conductivity without causing adverse chemical changes in the battery, and for example, a conductive material may comprise graphite such as natural graphite and artificial graphite; carbon blacks such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. The conductive agent may be used in an amount of 1 wt % to 9 wt % with respect to the total weight of the slurry for a negative electrode active material.

A negative electrode current collector used in the negative electrode according to an embodiment of the present invention may have a thickness of 3 µm to 500 µm. Any material may be used as the negative electrode current collector so long as it has conductivity as well as not causing adverse chemical changes in the battery, and for example, copper, gold, stainless steel, aluminum, nickel, titanium, fired carbon, copper or stainless steel that is surface-treated with one of carbon, nickel, titanium, silver, or the like, or an aluminum-cadmium alloy may be used. Also, the current collector may have an uneven surface to improve the bonding strength of the negative electrode active material. The current collector may be used in various shapes, such as that of a film, a sheet, a foil, a net, a porous body, a foam body, a non-woven fabric body, and the like.

The positive electrode may be manufactured by a common method known in the art, for example, by coating a current collector (220) of a metal material with a slurry which is obtained by, for example, mixing a positive electrode active material, a solvent, a binder as necessary, a conductive agent, and a dispersing agent and stirring, and then compressing and drying.

Any metal may be used as the metal material of the current collector so long as it is a metal having high conductivity as well as not causing adverse chemical changes in the battery in a voltage range of the battery to which the slurry of the positive electrode active material may be easily adhered, and, for example, stainless steel, aluminum, nickel, titanium, fired carbon, or aluminum or stainless steel that is surface-treated with one of carbon, nickel, titanium, silver, or the like may be used. Also, the current collector may have an uneven surface to improve the bonding strength of the positive electrode active material. The current collector may be used in various shapes, such as that of a film, a sheet, a foil, a net, a porous body, a foam body, a non-woven fabric body, and the like, and may have a thickness of 3 to 500 µm.

Examples of the positive electrode active material may be, for example, a layer compound such as lithium cobalt oxide (LiCoO2); lithium nickel oxide (LiNiO$_2$); Li[Ni$_a$Co$_b$Mn$_c$M$^1{}_d$]O$_2$ (where M$^1$ is any one selected from the group consisting of Al, Ga, and In, or two or more elements thereof, and $0.3 \leq a<0.1$, $0 \leq b \leq 0.5$, $0 \leq c \leq 0.5$, $0 \leq d \leq 0.1$, and $a+b+c+d=1$); Li (Li$_e$M$^2{}_{f-e-f}$M$^3{}_f$)O$_{2-g}$A$_g$ (where $0 \leq e \leq 0.2$, $0.6 \leq f \leq 1$, $0 \leq f' \leq 0.2$, and $0 \leq g \leq 0.2$, M$^2$ comprises Mn and at least one selected from the group consisting of Ni, Co, Fe, Cr, V, Cu, Zn, and Ti, M$^3$ is at least one selected from the group consisting of Al, Mg, and B, and A is at least one selected from the group consisting of P, F, S, and N), or a compound substituted with at least one transition metal; lithium manganese oxides such as Li$_{1+h}$Mn$_{2-h}$O$_4$ (where $0 \leq h \leq 0.33$), LiMnO$_3$, LiMn$_2$O$_3$, and LiMnO$_2$; lithium copper oxide (Li$_2$CuO$_2$); vanadium oxides such as LiV$_3$O$_8$, V$_2$O$_5$, and Cu$_2$V$_2$O$_7$; Ni-site type lithium nickel oxide represented by the chemical formula LiNi$_{1-i}$M$^4{}_i$O$_2$ (where M$^4$ is Co, Mn, Al, Cu, Fe, Mg, B, or Ga, and $0.01 \leq i \leq 0.3$); lithium manganese complex oxide represented by the chemical formula LiMn$_{2-j}$M$^5{}_j$O$_2$ (where M$^5$ is Co, Ni, Fe, Cr, Zn, or Ta, and $0.01 \leq j \leq 0.1$) or Li$_2$Mn$_3$M$^6$O$_8$ (where M$^6$ is Fe, Co, Ni, Cu, or Zn); LiMn$_2$O$_4$ having a part of Li being substituted with alkaline earth metal ions; a disulfide compound; LiFe$_3$O$_4$, and Fe$_2$(MoO$_4$)$_3$. However, the positive electrode active material is not limited thereto.

An organic solvent, such as N-methylpyrrolidone (NMP), dimethylformamide (DMF), acetone, and dimethylacetamide, and water, may be used as the solvent for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), sulfonated EPDM, styrene-butadiene rubber (SBR), fluorine rubber, poly(acrylic acid), polymers in which hydrogen atoms thereof are substituted with Li, Na, or Ca, or various copolymers, may be used as the binder.

Any conductive agent may be used without particular limitation so long as it has suitable conductivity without causing adverse chemical changes in the battery. For example, the conductive agent may comprise a conductive material such as: graphite such as natural graphite or artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 20 wt % based on the total weight of the total positive electrode slurry.

An aqueous dispersant or an organic dispersant such as N-methyl-2-pyrrolidone, may be used as the dispersant.

A lithium salt, which may be included as the electrolyte used in the present invention, may be used without limitation so long as it is typically used in an electrolyte for a lithium secondary battery. For example, any one selected from the group consisting of F$^-$, Cl$^-$, Br$^-$, I$^-$, NO$_3{}^-$, N(CN)$_2{}^-$, BF$_4{}^-$, ClO$_4{}^-$, PF$_6{}^-$, (CF$_3$)$_2$PF$_4{}^-$, (CF$_3$)$_3$PF$_3{}^-$, (CF$_3$)$_4$PF$_2{}^-$, (CF$_3$)$_5$PF$^-$, (CF$_3$)$_6$P$^-$, CF$_3$SO$_3{}^-$, CF$_3$CF$_2$SO$_3{}^-$, (CF$_3$SO$_2$)$_2$N$^-$, (FSO$_2$)$_2$N$^-$, CF$_3$CF$_2$(CH$_3$)$_2$CO$^-$, (CF$_3$SO$_2$)$_2$CH$^-$, (SF$_5$)$_3$C$^-$, (CF$_3$SO$_2$)$_3$C$^-$, CF$_3$(CF$_2$)$_7$SO$_3{}^-$, CF$_3$CO$_2{}^-$, CH$_3$CO$_2{}^-$, SCN$^-$, and (CF$_3$CF$_2$SO$_2$)$_2$N$^-$ may be used as an anion of the lithium salt.

The electrolyte used in the present invention may comprise an organic liquid electrolyte, an inorganic liquid electrolyte, a solid polymer electrolyte, a gel-type polymer electrolyte, a solid inorganic electrolyte, and a molten inorganic electrolyte which may be used in the manufacture of the lithium secondary battery, but the present invention is not limited thereto.

A shape of the lithium secondary battery of the present invention is not particularly limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module comprising a plurality of battery cells.

Preferred examples of the medium and large sized device may be an electric vehicle, a hybrid electric vehicle, a plug-in hybrid electric vehicle, or a power storage system, but the medium and large sized device is not limited thereto.

MODE FOR CARRYING OUT THE INVENTION

Examples

Hereinafter, the present invention will be described in detail, according to specific examples and experimental examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

Example 1

<Negative Electrode Manufacture>

A negative electrode slurry was prepared by adding 96 wt % of artificial graphite with an average particle diameter ($D_{50}$) of 15 μm, 1 wt % of Denka black (conductive agent), 2 wt % of SBR (binding agent), and 1 wt % of CMC (thickener) to water. One side of a copper current collector was coated with the negative electrode slurry thus prepared to a thickness of 65 μm, dried, pressed to achieve an electrode density of 1.72 g/cc, and punched to a constant size to manufacture a negative electrode. The artificial graphite was assembled into secondary particles and was block graphite which was obtained from cokes by graphitizing using a graphitizing catalyst at 3,000° C. or more.

On the surface of the product on which the negative electrode active material layer was formed, a mixture solution obtained by mixing 5 g of $Al_2O_3$ with an average particle diameter ($D_{50}$) of 500 nm, and 2 g of carboxymethyl cellulose and 100 ml of water, was uniformly mixed using a P.D mixer, and was sprayed using a slot die coater in a rate of 10 m per minute from the die to form a ceramic separating layer having a thickness of 10 μm, and an average pore diameter ($D_{50}$) of 200 nm.

Example 2

<Negative Electrode Manufacture>

A negative electrode was manufactured by the same method in Example 1 except for forming the ceramic separating layer to a thickness of 20 μm.

Example 3

<Negative Electrode Manufacture>

A negative electrode was manufactured by the same method in Example 1 except for forming the ceramic separating layer to a thickness of 30 μm.

Example 4

A negative electrode was manufactured by the same method in Example 1 except for pressing to achieve an electrode density of 1.81 g/cc.

Example 5

A negative electrode was manufactured by the same method in Example 1 except for pressing to achieve an electrode density of 1.79 g/cc.

Example 6

A negative electrode was manufactured by the same method in Example 1 except for pressing to achieve an electrode density of 1.76 g/cc.

Example 7

A negative electrode was manufactured by the same method in Example 1 except for pressing to achieve an electrode density of 1.69 g/cc.

Example 8

<Negative Electrode Manufacture>

A first negative electrode slurry was prepared by adding 96 wt % of artificial graphite with an average particle diameter ($D_{50}$) of 15 μm, 1 wt % of Denka black (conductive agent), 2 wt % of SBR (binding agent), and 1 wt % of CMC (thickener) to water, and a second negative electrode slurry was prepared by adding 96 wt % of artificial graphite with an average particle diameter ($D_{50}$) of 4 μm, 1 wt % of Denka black (conductive agent), 2 wt % of SBR (binding agent), and 1 wt % of CMC (thickener) to water.

One side of a copper current collector was coated with the first negative electrode slurry thus prepared to a thickness of 60 μm, dried, pressed with 1.72 g/cc, and the coated surface of the first negative electrode slurry was coated with the second negative electrode slurry thus prepared to a thickness of 5 μm, dried, pressed to achieve 1.72 g/cc, and punched to a constant size to manufacture a negative electrode.

The artificial graphite of the first negative electrode slurry was assembled into secondary particles, was fragment graphitized graphite which was obtained by graphitizing at 3,000° C. or more, and was composed of needle cokes as a main component. The artificial graphite of the second negative electrode slurry was assembled into secondary particles, was block graphite which was obtained by graphitizing using a catalyst at 3,000° C. or more, and was composed of needle cokes as a main component.

On the surface of the product on which the negative electrode active material layer was formed, a mixture solution obtained by mixing 5 g of $Al_2O_3$ with an average particle diameter ($D_{50}$) of 500 nm, 2 g of carboxymethyl cellulose and 100 ml of water, was uniformly mixed using a P.D mixer, and was sprayed using a slot die coater in a rate of 10 m per minute from the die to form a ceramic separating layer having a thickness of 10 μm, and an average pore diameter ($D_{50}$) of 200 nm.

Comparative Example 1

<Negative Electrode Manufacture>

A negative electrode was manufactured by the same method in Example 1 except for using artificial graphite with an average particle diameter ($D_{50}$) of 15 μm, which was assembled into secondary particles, was fragment graphitized graphite which was obtained by graphitizing at 3,000° C. or more, and was composed of mosaic cokes as a main component.

Comparative Example 2

<Negative Electrode Manufacture>

A negative electrode was manufactured by the same method in Comparative Example 1 except for forming the ceramic separating layer to a thickness of 20 μm.

Comparative Example 3

<Negative Electrode Manufacture>

A negative electrode was manufactured by the same method in Comparative Example 1 except for forming the ceramic separating layer to a thickness of 30 μm.

Comparative Example 4

<Negative Electrode Manufacture>

A negative electrode was manufactured by the same method in Example 1 except for using artificial graphite with an average particle diameter ($D_{50}$) of 4 μm, which was assembled into secondary particles, was fragment graphitized graphite which was obtained by graphitizing at 3,000° C. or more, and was composed of mosaic cokes as a main component.

TABLE 1

| | Electrode density (g/cc) | Ceramic separating layer thickness (μm) |
|---|---|---|
| Example 1 | 1.72 | 10 |
| Example 2 | 1.72 | 20 |
| Example 3 | 1.72 | 30 |
| Example 4 | 1.81 | 10 |
| Example 5 | 1.79 | 10 |
| Example 6 | 1.76 | 10 |
| Example 7 | 1.69 | 10 |
| Example 8 | 1.72/1.72 | 10 |
| Comparative Example 1 | 1.72 | 10 |
| Comparative Example 2 | 1.72 | 20 |
| Comparative Example 3 | 1.72 | 30 |
| Comparative Example 4 | 1.72 | 10 |

Experimental Example 1: Evaluation of Pellet Density and Negative Electrode Orientation The pellet density of the negative electrode slurries prepared in Examples 1 to 8 and Comparative Examples 1 to 4 was measured, and the results are shown in Table 2 below.

Each of the negative electrode slurries prepared in Examples 1 to 8 and Comparative Examples 1 to 4 was put in a bowl made of an aluminum foil, put in an oven at 110° C. and completely dried. The dried slurry powder was ground finely using a mortar and a pestle, sieved using a 250-mesh sieve. 1 g of the powder was weighed and put in a pellet zig, and then, a pressure of 1,000 kg/m³ was applied to manufacture a pellet. The slurry pellet thus completed was stood for 6 hours, and the weight and thickness of the pellet were measured. In this case, the density of the pellet was calculated using the thickness and weight measured.

In addition, the orientation of negative electrodes manufactured in Examples 1 to 8 and Comparative Examples 1 to 4 was evaluated by an X-ray diffraction (XRD) analysis method, and the results are shown in Table 2 below.

Each of the negative electrode slurries prepared in Examples 1 to 8 and Comparative Examples 1 to 4 was put in a bowl made of an aluminum foil, put in an oven at 110° C. and completely dried. The dried slurry powder was ground finely using a mortar and a pestle, sieved using a 250-mesh sieve. 1 g of the powder was weighed and put in a pellet zig, and then, a pressure was applied so that the density of the pellet became 1.6 g/cc to manufacture a pellet. The pellet thus manufactured was filled in an exclusive holder of an XRD equipment and pressed using a slide glass to planarize the surface, and then, an XRD analysis was conducted.

The orientation was obtained by measuring the (110) surface and (004) surface of the negative electrode active material included in the negative electrode, integrating the peak intensity of the (110) surface and the (004) surface, and calculating an area ratio ((110)/(004)). Particularly, XRD measurement conditions are as follows.

target: Cu (Kα-ray) graphite monochromator
slit: divergent slit=1 degree, receiving slit=0.1 mm, scattering slit=1 degree
measurement section and step angle/measurement time:
(110) surface: 76.5 degrees<2θ<78.5 degrees, 0.01 degrees/3 seconds
(004) surface: 53.5 degrees<2θ<56.0 degrees, 0.01 degrees/3 seconds, where 2θ represents a diffraction angle.

Experimental Example 2: Measurement of Roughness of Negative Electrode Active Material Layer The arithmetic average roughness (Ra) of the surface of the negative electrode active material layer of the negative electrode manufactured in each of Examples 1 to 8 and Comparative Examples 1 to 4 was measured using a confocal laser microscope, and the results are shown in Table 2 below.

Particularly, in the surface of the negative electrode active material layer of the negative electrode manufactured in each of Examples 1 to 8 and Comparative Examples 1 to 4, a field view of 1 mm×1 mm was measured for 512×512 pixels using a confocal laser microscope (manufacturer, product name), and from the average line of each dot, an absolute value was calculated from arithmetic mean.

TABLE 2

| | Pellet density (@ 1,000 kg/m³) | Orientation ($I_{004}/I_{110}$) | Arithmetic average roughness ($R_a$, μm) |
|---|---|---|---|
| Example 1 | 1.88 g/cc | 58 | 0.2 |
| Example 2 | 1.88 | 58 | 0.2 |
| Example 3 | 1.88 | 58 | 0.2 |

TABLE 2-continued

|  | Pellet density (@ 1,000 kg/m³) | Orientation ($I_{004}/I_{110}$) | Arithmetic average roughness ($R_a$, μm) |
|---|---|---|---|
| Example 4 | 1.95 | 67 | 0.03 |
| Example 5 | 1.93 | 64 | 0.09 |
| Example 6 | 1.91 | 60 | 0.16 |
| Example 7 | 1.80 | 53 | 0.25 |
| Example 8 | 1.70 | 25 | 0.2 |
| Comparative Example 1 | 1.67 | 16 | 1.5 |
| Comparative Example 2 | 1.67 | 16 | 1.5 |
| Comparative Example 3 | 1.67 | 16 | 1.5 |
| Comparative Example 4 | 1.55 | 8 | 2.8 |

Example 1-1 <Lithium Secondary Battery Manufacture>

<Positive Electrode Manufacture>

A positive electrode mixture slurry was prepared by adding 94 wt % of Li(Li$_{1.2}$Co$_{0.1}$Ni$_{0.1}$Mn$_{0.6}$)O$_2$ as a positive electrode active material, 3 wt % of carbon black as a conductive agent, and 3 wt % of PVdF as a binding agent to an N-methyl-2-pyrrolidone (NMP) solvent. An aluminum (Al) thin film which was a positive electrode current collector with a thickness of about 20 μm, was coated with the positive electrode mixture slurry and dried to manufacture a positive electrode. Then, the positive electrode was roll pressed.

On the ceramic separating layer of the negative electrode manufactured in Example 1, the positive electrode was oppositely disposed to manufacture an electrode assembly, and this was put in a pouch type batter case. Then, an electrolyte obtained by dissolving 1 M LiPF$_6$ in a mixture solvent of ethylene carbonate (EC) and diethyl carbonate (DEC) in a volume ratio of 30:70 was injected to manufacture a unified stack cell lithium secondary battery.

Examples 2-1 to 8-1

Lithium secondary batteries were manufactured by the same method described in Example 1-1 except for using the negative electrodes manufactured in Examples 2 to 8, respectively, instead of the negative electrode manufactured in Example 1.

Comparative Examples 1-1 to 1-4

Lithium secondary batteries were manufactured by the same method described in Example 1-1 except for using the negative electrodes manufactured in Comparative Examples 1 to 4, respectively, instead of the negative electrode manufactured in Example 1.

Experimental Example 3: SEM

Figure 2:
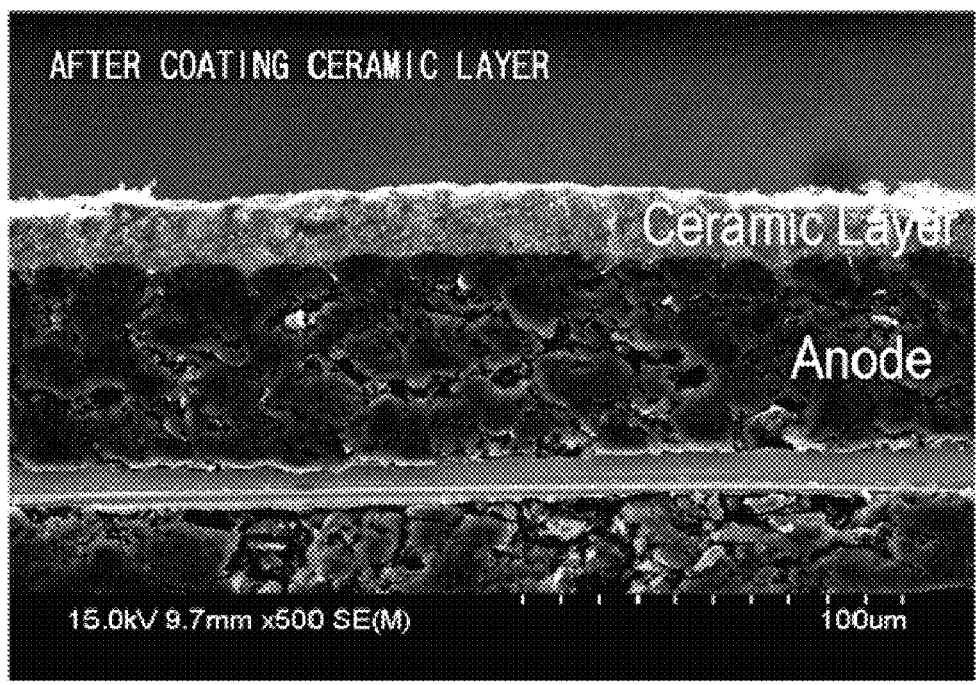
FIG. 2 is a photographic image of a stacked surface of a negative electrode of Example 1 taken by using SEM.
Figure 3:
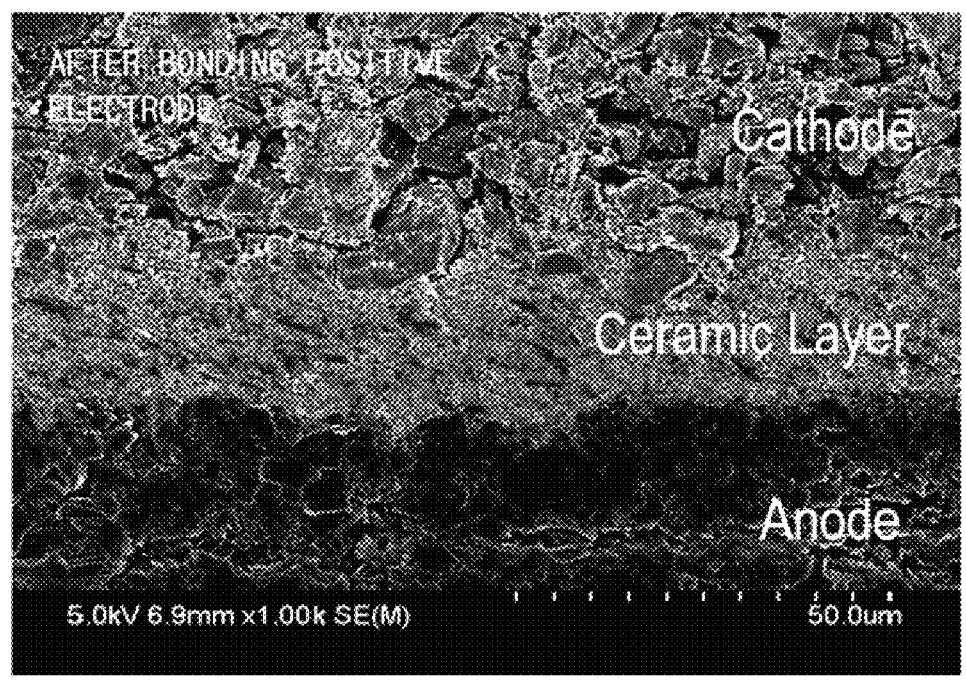
FIG. 3 is a photographic image of a stacked surface of a lithium secondary battery of Example 5 taken by using SEM.

The cross-sections of the electrode assemblies of the negative electrode of Example 1 and the lithium secondary battery of Example 1-1 were taken using SEM and shown in FIG. 2 (Example 1) and FIG. 3 (Example 1-1), respectively.

Referring to FIG. 2, it was found that a ceramic separating layer was uniformly formed on the negative electrode active material layer of the negative electrode. In addition, referring to FIG. 3, a negative electrode and a positive electrode were oppositely disposed with the ceramic separating layer boundary, and it was found that the ceramic separating layer was stably positioned between the negative electrode and the positive electrode.

Experimental Example 4: Evaluation of Electrochemical Properties

<Positive/Negative Electrode Insulating Resistance Measurement>

Between the negative electrode and a pouch, and the positive electrode and the pouch of each of the lithium secondary batteries manufactured in Examples 1-1 to 8-1 and Comparative Examples 1-1 to 4-1, a voltage of 50 V was applied, and resistance was measured after 1 second to check the flow of leakage current, and the resistance degree thereto was evaluated to evaluate the insulation between the positive/negative electrode and the pouch.

<Evaluation of Life Characteristics>

The batteries thus manufactured were charged at constant current/constant voltage (CC/CV) conditions at 45° C. with 1 C to 4.2 V/38 mA, and, thereafter, were discharged at constant current (CC) conditions with 1C to 2.5 V, and discharge capacity was measured. This cycle was repeated by 1 to 100 cycles.

Energy density was represented by Wh/L, which represents battery capacity per 1 L volume in case where the negative electrode active material was coated, and the discharge capacity after 100 cycles was divided by the discharge capacity after 1 cycle to represent life characteristics. The results are shown in Table 3 below.

TABLE 3

|  | Positive/negative electrode insulating resistance (MΩ) | Life characteristics (@ 100 cycles, %) | Energy density (Wh/L) |
|---|---|---|---|
| Example 1-1 | 0.89 | 92 | 600 |
| Example 2-1 | 1.02 | 90 | 520 |
| Example 3-1 | 1.18 | 85 | 440 |
| Example 4-1 | 0.88 | 70 | 630 |
| Example 5-1 | 0.89 | 73 | 620 |
| Example 6-1 | 0.90 | 75 | 610 |
| Example 7-1 | 0.75 | 80 | 580 |
| Example 8-1 | 0.88 | 95 | 540 |
| Comparative Example 1-1 | 0.08 | 28 | 600 |
| Comparative Example 2-1 | 0.50 | 40 | 560 |
| Comparative Example 3-1 | 0.89 | 45 | 520 |
| Comparative Example 4-1 | 0.02 | 15 | 470 |

Referring to Table 3, it was found that the lithium secondary batteries of Examples 1-1 to 8-1 showed excellent insulating resistance and excellent life characteristics. On the contrary, the lithium secondary batteries of Comparative Examples 1-1 to 4-1 showed inferior life characteristics and the insulating resistance thereof was also bad excluding Comparative Example 3-1 in which a ceramic separating layer with a thickness of 30 μm was formed. The lithium secondary batteries of Examples 1-1 to 3-1 comprise negative electrodes on which ceramic separating layers with thicknesses of 10 μm, 20 μm and 30 μm were formed, respectively, on the negative electrode active material layer with arithmetic average roughness (Ra) of 0.2 μm. With the increase of the thickness of the ceramic separating layer, the insulating resistance was increased but life characteristics and energy density were decreased. Accordingly, in order to improve the life characteristics and the energy density of the lithium secondary battery, the thickness of the ceramic separating layer is required to decrease as thin as possible but in a common negative electrode, in order to keep insulating properties, the thickness of the ceramic separating layer is required to have a thickness of a certain degree or more. Particularly, from the results of Comparative Examples 1-1 to 4-1, lithium secondary batteries (Comparative Examples 1-1 to 3-1) using common artificial graphite, that is, artificial graphite with an average particle diameter ($D_{50}$) of 15 μm as a negative electrode active material, and a lithium secondary battery (Comparative Example 4-1) using artificial graphite with an average particle diameter ($D_{50}$) of 4 μm as a negative electrode active material had high arithmetic average roughness (Ra) of the negative electrode of 1.5 μm and 2.8 μm. Accordingly, it was found that if the thickness of the ceramic separating layer was 10 μm and 20 μm, insulating resistance was low, and if the thickness reached 30 μm, the insulating resistance showed a high value.

Meanwhile, all lithium secondary batteries of Comparative Examples 1-1 to 4-1 showed inferior life characteristics, and particularly, though the lithium secondary battery of Comparative Example 3-1 had positive/negative electrode insulating resistance of 0.89 MΩ, 100 cycle life characteristics was only 45%. Accordingly, it was secured that if the arithmetic average roughness (Ra) of the negative electrode was high, it was found difficult that the ceramic separating layer kept appropriate insulating properties.

Through this, the lithium secondary batteries of Examples 1-1 to 8-1 were found to achieve energy density increase in accordance with the thinning of the ceramic separating layer, and stable maintenance of the insulating properties of the ceramic separating layer at the same time.

REFERENCE NUMERAL

100: negative electrode
110: negative electrode active material layer
120: ceramic separating layer
130: negative electrode collector
200: positive electrode
210: positive electrode active material layer
220: positive electrode collector

The invention claimed is:

1. A lithium secondary battery, comprising a negative electrode and a positive electrode,
   wherein the negative electrode comprises:
   a negative electrode active material layer, wherein the negative electrode active material layer comprises a negative electrode active material; and
   a ceramic separating layer formed on the negative electrode active material layer,
   wherein a positive electrode active material layer of the positive electrode contacts the ceramic separating layer of the negative electrode active material layer,
   wherein the negative electrode active material layer has an arithmetic average surface roughness (Ra) of 0.01 μm to 0.3 μm,
   wherein the ceramic separating layer has a thickness of 1 μm to 30 μm, and
   wherein the ceramic separator layer is a single layer,
   wherein the negative electrode active material comprises a graphite-based active material,
   wherein the graphite-based material is a block graphite,
   wherein the block graphite has a spherical secondary particle structure comprising a plurality of initial particles composed of artificial graphite, and
   wherein at least one of the plurality of initial particles has an edge part having a bent layer structure in a polygonal shape.

2. The lithium secondary battery according to claim 1, wherein the negative electrode active material layer is formed from a negative electrode slurry having a pellet density of 1.7 g/cc to 2.2 g/cc when a pressure of 1,000 kg/m3 is applied.

3. The lithium secondary battery according to claim 1, wherein the negative electrode active material layer is formed from a negative electrode slurry, wherein when a density of a pellet formed by drying the negative electrode slurry is 1.6 g/cc, the negative electrode active material has an orientation (I004/I110) of 50 to 70, and
   wherein the orientation (I004/I110) is measured by XRD.

4. The lithium secondary battery according to claim 1, wherein the negative electrode active material has an average particle diameter (D50) of 7 μm to 30 μm.

5. The lithium secondary battery according to claim 1, wherein the ceramic separating layer has a thickness of 3 μm to 15 μm.

6. The lithium secondary battery according to claim 1, wherein the ceramic separating layer comprises inorganic particles having an average particle diameter (D50) of 10 nm to 10 μm.

7. The lithium secondary battery according to claim 1, wherein the ceramic separating layer comprises pores having an average particle diameter (D50) of 1 nm to 50 μm.

8. The lithium secondary battery according to claim 1, wherein the ceramic separating layer has a porosity of 5 to 60%.

9. The lithium secondary battery according to claim 1, wherein the ceramic separating layer comprises one or more selected from the group consisting of $Al_2O_3$, $ZrO_2$, $SiO_2$, $TiO_2$, ZnO, $BaTiO_3$, $SrTiO_3$, $CaCO_3$, CaO, $CeO_2$, NiO, MgO, $SnO_2$, $Y_2O_3$, $Pb(Zr,Ti)O_3$ (PZT), $(Pb,La)(Zr,Ti)O_3$ (PLZT), $PB(Mg_{3}Nb_{2/3})O_3$—$PbTiO_3$ (PMN-PT) and hafnia ($HfO_2$).

10. The lithium secondary battery according to claim 1, wherein the ceramic separating layer comprises one or more selected from the group consisting of Al2O3, ZrO2, SiO2 and TiO2.

11. The lithium secondary battery according to claim 1, wherein the negative electrode active material layer comprises a first negative electrode active material layer and a second negative electrode active material layer formed on the first negative electrode active material layer, and the second negative electrode active material layer comprises a negative electrode active material having an average particle diameter (D50) of 0.03 μm to 7 μm.

12. The lithium secondary battery according to claim 11, wherein the first negative electrode active material layer comprises a negative electrode active material having an average particle diameter (D50) of 5 μm to 30 μm.

13. The lithium secondary battery according to claim 1, wherein the negative electrode active material has an arithmetic average surface roughness (Ra) of 0.05 μm to 0.25 μm and an average particle diameter (D50) of 10 μm to 25 μm.

14. The lithium secondary battery according to claim 1, wherein the ceramic separating layer has a thickness of 5 μm to 10 μm and comprises inorganic particles having an average particle diameter (D50) of 10 nm to 10 μm.

15. The lithium secondary battery according to claim 11, wherein the first negative active material layer comprises a first graphite-based material which is fragmented graphitized graphite, and wherein the second negative active material layer comprises a second graphite-based material which is a block graphite.

* * * * *